United States Patent
Pfeifenberger et al.

(10) Patent No.: US 12,406,685 B2
(45) Date of Patent: Sep. 2, 2025

(54) METHODS AND SYSTEMS FOR CROSS-CORRELATING AND ALIGNING PARALLEL SPEECH UTTERANCES TO IMPROVE QUALITY ASSURANCE

(71) Applicant: Sanas.ai Inc., Palo Alto, CA (US)

(72) Inventors: Lukas Pfeifenberger, Salzburg (AT); Shawn Zhang, Palo Alto, CA (US)

(73) Assignee: SANAS.AI INC., Palo Alto, CA (US)

( * ) Notice: Subject to any disclaimer, the term of this patent is extended or adjusted under 35 U.S.C. 154(b) by 0 days.

(21) Appl. No.: 18/613,833

(22) Filed: Mar. 22, 2024

(65) Prior Publication Data

US 2024/0363135 A1 Oct. 31, 2024

Related U.S. Application Data

(60) Provisional application No. 63/462,002, filed on Apr. 26, 2023.

(51) Int. Cl.
*G10L 21/12* (2013.01)
*G10L 25/30* (2013.01)
*G10L 25/60* (2013.01)

(52) U.S. Cl.
CPC .............. *G10L 21/12* (2013.01); *G10L 25/30* (2013.01); *G10L 25/60* (2013.01)

(58) Field of Classification Search
CPC .......... G10L 21/12; G10L 25/30; G10L 25/60
See application file for complete search history.

(56) References Cited

U.S. PATENT DOCUMENTS

| | | | | |
|---|---|---|---|---|
| 5,765,132 A | * | 6/1998 | Roberts | G10L 15/063 704/270 |
| 2008/0082320 A1 | * | 4/2008 | Popa | G10L 13/033 704/201 |
| 2008/0133225 A1 | * | 6/2008 | Yamada | G10L 15/1807 704/E15.045 |
| 2008/0201150 A1 | * | 8/2008 | Tamura | G10L 21/00 704/E21.001 |
| 2012/0253794 A1 | * | 10/2012 | Chun | G10L 21/007 704/201 |

(Continued)

*Primary Examiner* — Michael N Opsasnick
(74) *Attorney, Agent, or Firm* — Troutman Pepper Locke LLP (57) ABSTRACT

The disclosed technology relates to methods, voice conversion systems, and non-transitory computer readable media for determining quality assurance of parallel speech utterances. In some examples, a candidate utterance and a reference utterance in obtained audio data are converted into first and second time series sequence representations, respectively, using acoustic features and linguistic features. A cross-correlation of the first and second time series sequence representations is performed to generate a result representing a first degree of similarity between the first and second time series sequence representations. An alignment difference of path-based distances between the reference and candidate speech utterances is generated. A quality metric is then output, which is generated based on the result of the cross-correlation and the alignment difference. The quality metric is indicative of a second degree of similarity between the candidate and reference utterances.

20 Claims, 5 Drawing Sheets

(56) References Cited

U.S. PATENT DOCUMENTS

| | | | | |
|---|---|---|---|---|
| 2015/0317281 | A1* | 11/2015 | Sharifi | G06F 17/15 |
| | | | | 708/422 |
| 2016/0379622 | A1* | 12/2016 | Patel | G10L 13/06 |
| | | | | 704/260 |
| 2018/0032305 | A1* | 2/2018 | Cameron | G06F 40/30 |
| 2018/0286246 | A1* | 10/2018 | Baca | G08G 1/162 |
| 2020/0027444 | A1* | 1/2020 | Prabhavalkar | G10L 15/02 |
| 2021/0201890 | A1* | 7/2021 | Wang | G10L 15/30 |
| 2021/0398521 | A1* | 12/2021 | Hwang | G10L 15/02 |
| 2022/0310063 | A1* | 9/2022 | Sima | G10L 21/003 |
| 2023/0197084 | A1* | 6/2023 | Jang | G01S 3/802 |
| | | | | 704/235 |

* cited by examiner

METHODS AND SYSTEMS FOR CROSS-CORRELATING AND ALIGNING PARALLEL SPEECH UTTERANCES TO IMPROVE QUALITY ASSURANCE

This application claims priority to U.S. Provisional Patent Application Ser. No. 63/462,002, filed Apr. 26, 2023, which is hereby incorporated herein by reference in its entirety.

FIELD

This technology generally relates to audio analysis and, more particularly, to methods and systems for determining quality assurance of parallel speech utterances.

BACKGROUND

Voice conversion systems require a vast number of parallel datasets of utterances from a target speaker to achieve optimal performance. The quality of these datasets is crucial as it can have a significant impact on a system's output. In same-language movie dubbing, it is essential to match the timing and lip movements of the original as well as the pronunciation and dialogue delivery. Similarly, in karaoke, the singer must match the rhythm of the original lyrics, and a scoring metric can be used to evaluate their performance.

To create a voice conversion system, two recordings of the same utterance spoken by different individuals are required. One recording serves as the reference utterance, and the other serves as the candidate utterance. The goal is to match the reference utterance's rhythm and pitch, but the unique characteristics of each speaker make it challenging for the candidate utterance to meet acceptance criteria. Furthermore, differing accented pronunciations between speakers make the assessment process manual and tedious. As a result, quality assurance often requires a team of people to manually inspect and listen to the parallel utterances to determine if they meet the acceptance criteria.

As an example, a dubbing application may involve transforming an ordinary voice into a celebrity's voice for a computer game application. Instead of using the actual celebrity's voice, which may be expensive or unavailable, a voice conversion system is used to convert an ordinary person's speech (candidate speaker) to sound like the celebrity. In this case, choosing the best-suited candidate speaker among a set of candidate speakers enhances the output quality significantly. However, collecting an entire training database from all possible candidates, performing appropriate conversions for each candidate, comparing the conversions to each other, and obtaining subjective decisions from listeners on the output quality or suitability of each candidate is a time-consuming and expensive process.

One significant issue in obtaining parallel utterances is that speakers may have differing accented pronunciations. This difference can make it challenging to determine whether the candidate utterance is sufficiently close to the reference utterance. Consequently, quality assurance often involves a team of people manually inspecting and listening to the parallel utterances to determine if they meet acceptance criteria. However, manual inspection is time-consuming and prone to errors. Human perception is not always reliable and different individuals may have varying opinions on whether a candidate utterance is acceptable. This subjectivity can lead to inconsistencies in quality assurance, which may ultimately affect the accuracy and reliability of the collected data and/or system output.

BRIEF DESCRIPTION OF THE DRAWINGS

The disclosed technology is illustrated by way of example and not limitation in the accompanying figures, in which like references indicate similar elements.

DETAILED DESCRIPTION

Examples described below may be used to provide a method, a device (e.g., non-transitory computer readable medium), an apparatus, and/or a system for determining quality assurance of parallel speech utterances. Although the technology has been described with reference to specific examples, various modifications may be made to these examples without departing from the broader spirit and scope of the various embodiments of the technology described and illustrated by way of the examples herein. This technology advantageously assesses whether parallel utterances meet acceptance criteria in an automated, objective, and quantitative manner, reduces the time and cost required for manual inspection of candidate utterances, and improves the accuracy and reliability of the data collected by voice conversion systems.

Figure 1:
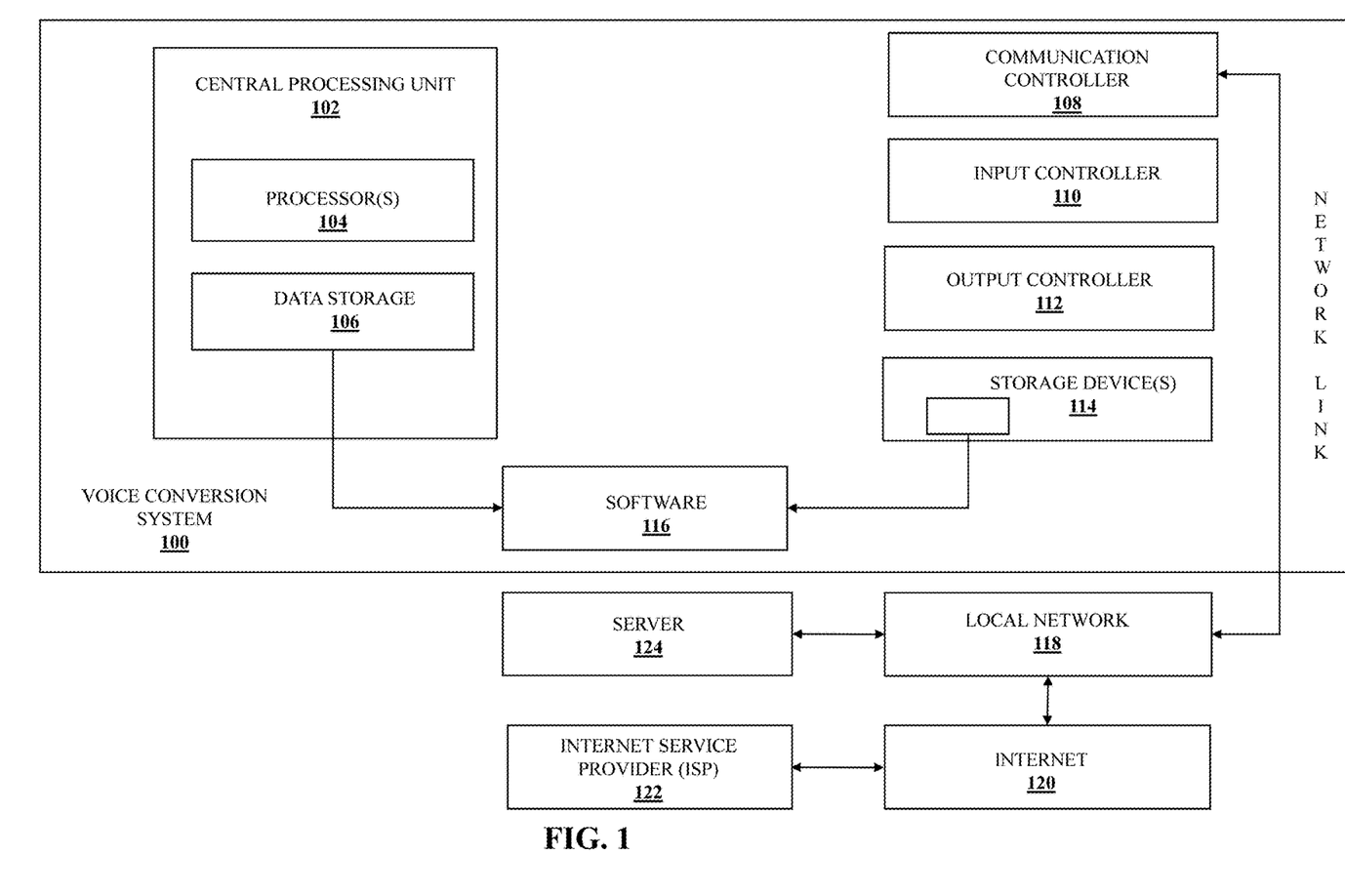
FIG. 1 is a block diagram of an exemplary network environment that includes a voice conversion system.

Referring now to FIG. 1, a block diagram of an exemplary network environment that includes a voice conversion system 100 is illustrated. The voice conversion system 100 in this example is configured for voice enhancement and includes processor(s) 104, which are designed to process instructions (e.g., computer readable instructions (i.e., code)) stored on the storage device(s) 114 (e.g., a non-transitory computer readable medium) of the voice conversion system 100. By processing the stored instructions, the processor(s) 104 may perform the steps and functions disclosed herein, such as with reference to FIG. 3 for example.

The storage device(s) 114 may be optical storage device(s), magnetic storage device(s), solid-state storage device(s) (e.g., solid-state disks (SSDs)) or non-transitory storage device(s), another type of memory, and/or a combination thereof, for example, although other types of storage device(s) can also be used. The storage device(s) 114 may contain software 116, which is a set of instructions (i.e., program code). Alternatively, instructions may be stored in one or more remote storage devices, for example storage devices (e.g., hosted by a server 124) accessed over a local network 118 or the Internet 120 via an Internet Service Provider (ISP) 122.

The voice conversion system 100 also includes an operating system and microinstruction code in some examples, one or both of which can be hosted by the storage device(s) 114. The various processes and functions described herein may either be part of the microinstruction code and/or program code (or a combination thereof), which is executed via the operating system. The voice conversion system 100 also may have data storage 106, which along with the processor(s) 104 form a central processing unit (CPU) 102, an input controller 110, an output controller 112, and/or a communication controller 108. A bus (not shown) may operatively couple components of the voice conversion system 100, including processor(s) 104, data storage 106, storage device(s) 114, input controller 110, output controller 112, and/or any other devices (e.g., a network controller or a sound controller).

Output controller 112 may be operatively coupled (e.g., via a wired or wireless connection) to a display device (e.g., a monitor, television, mobile device screen, touch-display, etc.) in such a fashion that output controller 112 can transform the display on the display device (e.g., in response to the execution of module(s)). Input controller 110 may be operatively coupled (e.g., via a wired or wireless connection) to an input device (e.g., mouse, keyboard, touchpad scroll-ball, touch-display, etc.) in such a fashion that input can be received from a user of the voice conversion system 100.

The communication controller 108 is coupled to a bus (not shown) in some examples and provides a two-way coupling through a network link to the Internet 120 that is connected to a local network 118 and operated by an ISP 122, which provides data communication services to the Internet. The network link typically provides data communication through one or more networks to other data devices. For example, a network link may provide a connection through local network 118 to a host computer and/or to data equipment operated by the ISP 122. A server 124 may transmit requested code for an application through the Internet 120, ISP 122, local network 118 and/or communication controller 108.

The voice conversion system 100 is illustrated in FIG. 1 with all components as separate devices for ease of identification only. One or more of the components of the voice conversion system 100 in other examples may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The voice conversion system 100 also may be one or more servers, for example a farm of networked or distributed servers, a clustered server environment, or a cloud network of computing devices. Other network topologies can also be used in other examples.

Figure 2:
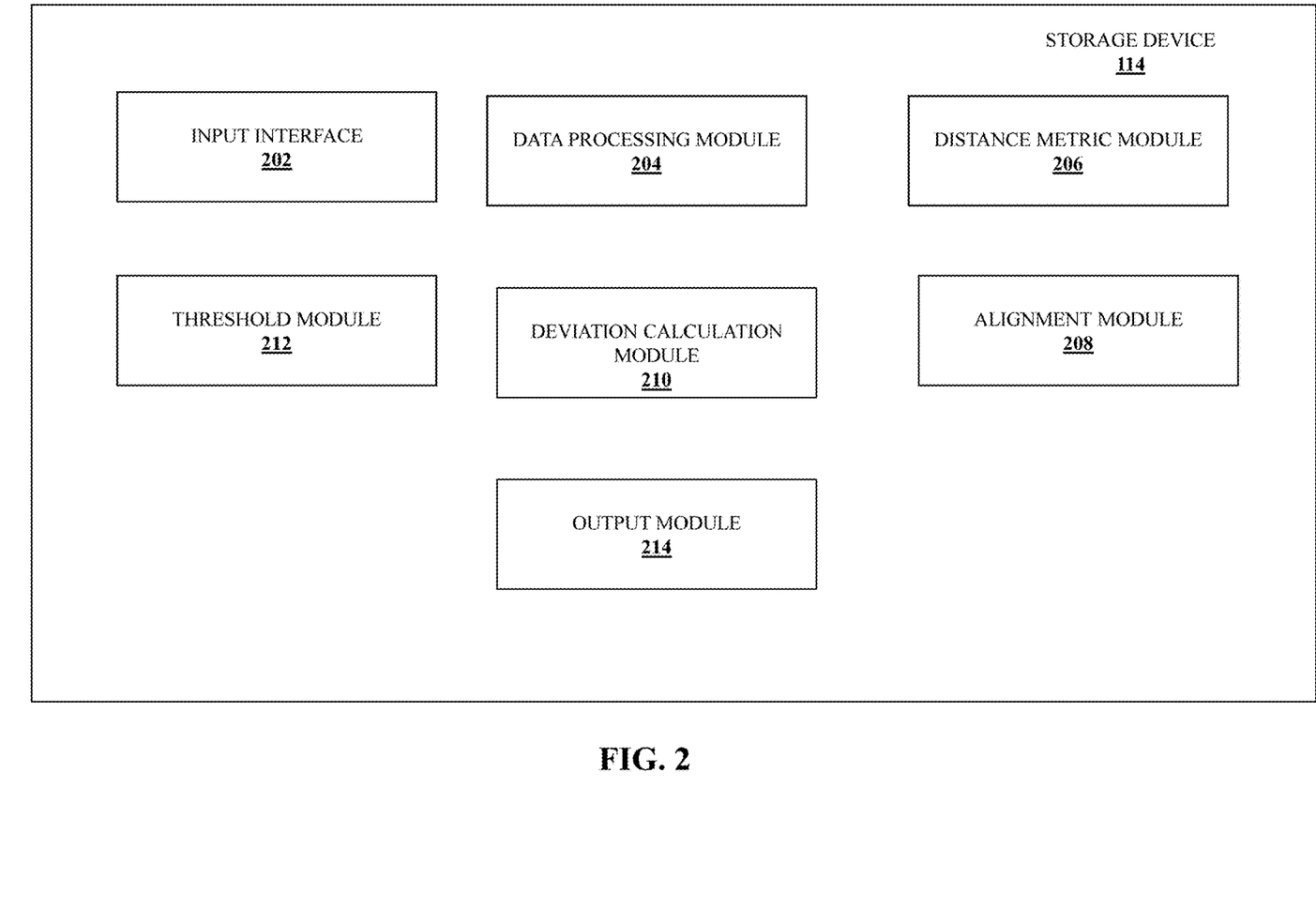
FIG. 2 is a block diagram of an exemplary storage device of the voice conversion system of FIG. 1.

Referring now to FIG. 2, a block diagram of an exemplary one of the storage device(s) 114 of the voice conversion system 100 is illustrated. The storage device 114 may include an input interface 202, a data processing module 204, a distance metric module 206, an alignment module 208, a deviation calculation module 210, a threshold module 12, and/or an output module 214. The input interface 202 may allow a user of the voice conversion system 100, or a client device communicably coupled thereto, to input two parallel utterances to be compared. The input interface 202 may support various audio formats and/or accept any number or type of audio inputs for comparison.

The data processing module 204 may process the input audio data including the two parallel utterances to convert it into a time series sequence representation, such as spectrogram(s), mel spectrogram(s), Mel-Frequency Cepstral Coefficient(s) (MFCC(s), and/or neural network speech embedding(s), although other types of time series sequence representations can also be used in other examples. The distance metric module 206 may calculate a distance metric representing a distance between the two parallel utterances represented by the input audio data using cross-correlation and/or alignment-based measures based on an alignment by the alignment module 208, for example, although other methods for determining the distance metric can also be used.

Thus, the alignment module 208 may perform alignment of the two parallel utterances to account for differences in the sequence lengths and/or phonemes used therein. Dynamic time warping, for example, may be used to align the two parallel utterances. In other examples, the alignment module 208 can use a neural network trained to generate a prediction of a most optimal path or alignment between the two parallel utterances. Other algorithms or methods can also be used in other examples.

The deviation calculation module 210 may calculate a deviation of an alignment path from an ideal path (e.g., a straight diagonal and/or an optimal path generated by the alignment module 208), which could act as a quality assurance metric. In other words, the threshold module 212 is configured to determine the strength of the alignment between the two parallel utterances. The threshold module 212 may have predetermined threshold(s) and/or rule(s) that can be used to classify the two parallel utterances as either passing or failing quality assurance. The output module 214 may display the results of the quality assurance analysis, including one or more of the distance metric, alignment path, deviation from the ideal path, or pass/fail classification.

Figure 3:
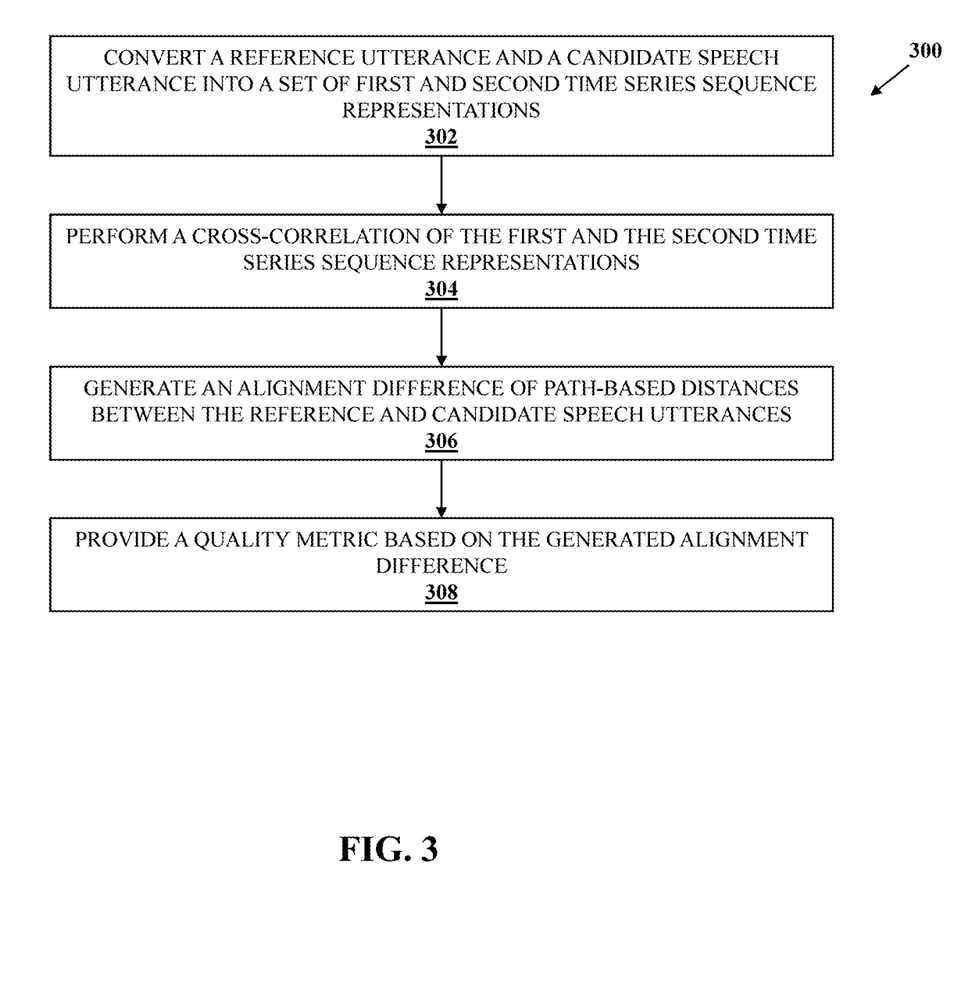
FIG. 3 is a flowchart of an exemplary method for determining quality assurance of parallel speech utterances.

Referring to FIG. 3, a flowchart of an exemplary method 300 for determining quality assurance of parallel speech utterances is illustrated. The method 300 can be executed by the processor(s) 104 of the voice conversion system 100 based on instruction stored in the storage device(s) 114 in some examples. As explained above, the instructions may be stored on a non-transitory computer readable medium of the storage device(s) 114, for example.

In step 302 in this example, the voice conversion system 100 converts a reference utterance and a candidate utterance into a set of first and second time series sequence representations, respectively. The reference and candidate utterances may be converted into time series sequence representations using various methods such as spectrogram(s), MFCC(s), and/or neural network speech embedding(s), for example. The reference and/or candidate utterances may be included in first and second audio data, respectively, one or more of which can be obtained directly by the voice conversion system 100 (e.g., via a microphone) or indirectly from a separate device (e.g., a client or server device (e.g., server 124)) via one or more communication networks (e.g., local network 118 or the Internet 120). Other methods for obtaining the first and second audio data comprising the reference and candidate utterances, respectively, can also be used in other examples.

In some examples, converting the reference utterance and the candidate utterance into a set of time series sequence representations may involve using a combination of acoustic and/or linguistic features. For example, in addition to traditional acoustic features such as spectrograms or MFCCs, linguistic features such as phoneme or word embeddings could be incorporated into one or more of the time series sequence representations. These linguistic features may be derived using natural language processing (NLP) technique(s), such as deep neural networks or transformer models, for example, although other NLP technique(s) can also be used.

By incorporating both acoustic and linguistic features, the resulting time series sequence representation(s) may capture not only the acoustic characteristics of the speech, but also the underlying linguistic content. Capturing the linguistic content may improve the accuracy of the quality assurance assessment described and illustrated herein with reference to FIG. 3, for example, as it may allow for a more comprehensive analysis of the parallel reference and candidate utterances. More specifically, using only acoustic features (e.g., mel spectrograms) for alignment is prone to mismatched alignment mappings because there are auxiliary elements entangled in speech. For example, background noise may be wrongly mapped to a foreground speech unit in the candidate utterance.

In step 304, the voice conversion system 100 performs a cross-correlation of the first and the second time series sequence representations. In some examples, the reference and candidate utterances may be compared using cross-correlation to generate a score between 0.0 to 1.0.

In some examples, performing cross-correlation between two time series sequence representations can involve using a neural network. A neural network may be trained to learn a mapping between the first and second time series sequence representations of the reference and candidate utterances, respectively. The neural network may take the two time series sequence representations as inputs and output a score (e.g., between 0.0 to 1.0) representing the degree of similarity between the two time series sequence representations.

The neural network may incorporate various types of information, such as acoustic features, linguistic features, and/or other relevant information, depending on the specific application. For example, if the utterances are in different languages, the neural network may incorporate information about language-specific phonemes and/or language models to improve the accuracy of the similarity score.

In yet other examples, machine learning algorithm(s) (e.g., neural networks) may be used to learn and improve the voice conversion system 100 based on a large dataset of reference and candidate utterances. The machine learning algorithm(s) may be trained on the large dataset to identify features that make the utterances similar and/or different to thereby inform the scoring performed via the cross-correlation in step 304. These features may include aspects of speech such as rhythm, pitch, or intonation, for example.

In step 306, the voice conversion system 100, generates an alignment difference of path-based distances between the reference and candidate utterances. Thus, in some examples, assessing the distance between the two parallel reference and candidate utterances, and determining the quality assurance criteria, may be based on the distance between the two parallel utterances.

In other examples, alignment techniques (e.g., dynamic time warping (DTW)) may be used to determine the alignment path-based distances, accounting for differences in sequence lengths of the time series sequence representations and/or phoneme distinctions, for example. In one example, the distance between the two parallel utterances may be assessed using deep neural network(s) to learn a mapping between the two parallel utterances. This approach may involve training a deep neural network on a large dataset of paired utterances, such that it can learn to map between the two representations to optimize their similarity.

In another example, once the neural network, for example, is trained, it can be used to calculate a distance metric between the two time series sequence representations, such as the Euclidean distance or cosine similarity. Advantageously, calculating the distance metric using a trained neural network is highly flexible, as the neural network can be trained to learn to map between any type of time series representations.

In yet other examples, the voice conversion system 100 can use a combination of DTW and phoneme-based alignment to generate an alignment difference of path-based distances while considering differences in time series sequence representation lengths and phoneme distinctions. DTW may be applied to align the two sequences while considering the differences in time series sequence representation lengths. DTW may provide an optimal warping path that minimizes the distance between the two time series sequence representations.

After alignment with DTW, phoneme-based alignment may be performed to adjust for any phoneme distinctions between the two time series sequence representations. Phoneme-based alignment may involve segmenting the aligned time series sequence representations into phonemes and comparing the corresponding phonemes between the sequences. The phoneme-based alignment may use various techniques such as Hidden Markov Models (HMMs) and/or recurrent neural networks (RNNs).

In an example in which an RNN is used to estimate the alignment probabilities, an RNN-Transduced (RNN-T), which is a sequence-to-sequence model specifically designed for tasks such as speech recognition and machine translation, can be applied to align sequences of symbols (e.g., words or phonemes) from one utterance to another. The RNN-T in this example predicts the alignment between the input sequence (source) and the output sequence (target), while simultaneously generating the target sequence, and generates alignment probabilities for each position in the input sequence. Other machine learning models and/or other methods to estimate the alignment probabilities between phonemes can also be used.

The combination of DTW and phoneme-based alignment may account for both time series sequence representation length differences and phoneme distinctions, providing a more accurate alignment difference of path-based distances. This alignment difference may be calculated as the deviation of the actual warping path from an ideal diagonal path, for example, although other methods for determining the alignment difference as a distance metric can also be used in other examples.

In step 308, the voice conversion system 100 provides a quality metric based on a result of the cross-correlation in step 304 (e.g., a score) and/or the alignment difference generated in step 306. For example, the voice conversion system 100 can assume that a perfect correlation of a plot of the first and the second time series sequence representations would be a diagonal line. In this example, the quality metric can be determined based on a distance of the plotted data from the diagonal line such that a farther distance (e.g., cumulatively or on average) from the diagonal line results in a lower score or quality metric. In another example, orthogonal regression can be used to analyze the strength of the alignment and generate a score corresponding to the quality metric.

In yet another example, a neural network can be used to evaluate the alignment of a parallel pair of utterances, providing a predicted confidence score on the suitability. As a classification task, the neural network may use softmax activation or cross-entropy at the output layer, for example, to produce a probability, representing a confidence in how strong a parallel pair of utterances is together. In another example, a neural network may use computer vision to determine whether or to what degree a correlation diagram between two parallel utterances represents a strong correlation (e.g., straight diagonal).

The quality metric can be output on a display device coupled to the output controller 112, for example, or provided via a communication network to a client device. After alignment in step 306, the deviation of the alignment path from an idealistic path (e.g., a straight diagonal line) may be calculated and used as a metric, or portion thereof, for quality assurance. Thus, in some examples, the deviation may be used as a quality metric for the parallel speech utterances.

The quality metric can be compared to a threshold, and/or one or more rules can be applied, to determine whether acceptance criteria has been met with respect to the candidate utterance. In other words, the quality metric is indicative of a degree of similarity between the candidate and reference utterances or whether the candidate utterance is sufficiently close to the reference utterance. Thus, the quality metric can facilitate automated selection of a particular candidate utterance for a particular subsequent downstream use or purpose to improve or optimize the quality of the output of a voice conversion by the voice conversion system 100 based on utilization of the selected candidate utterance.

In one example, a user can record a candidate utterance via the voice conversion system 100 and the voice conversion system 100 can then automatically retrieve a reference utterance to use for evaluation of the candidate utterance. If the alignment between reference and candidate utterances is poor (e.g., below an established or stored quality metric threshold), the voice conversion system 100 can automatically reject the candidate utterance and optionally generate a message or warning back to the user (e.g., via the output controller 112) from which the candidate utterance was recorded.

Figure 4:
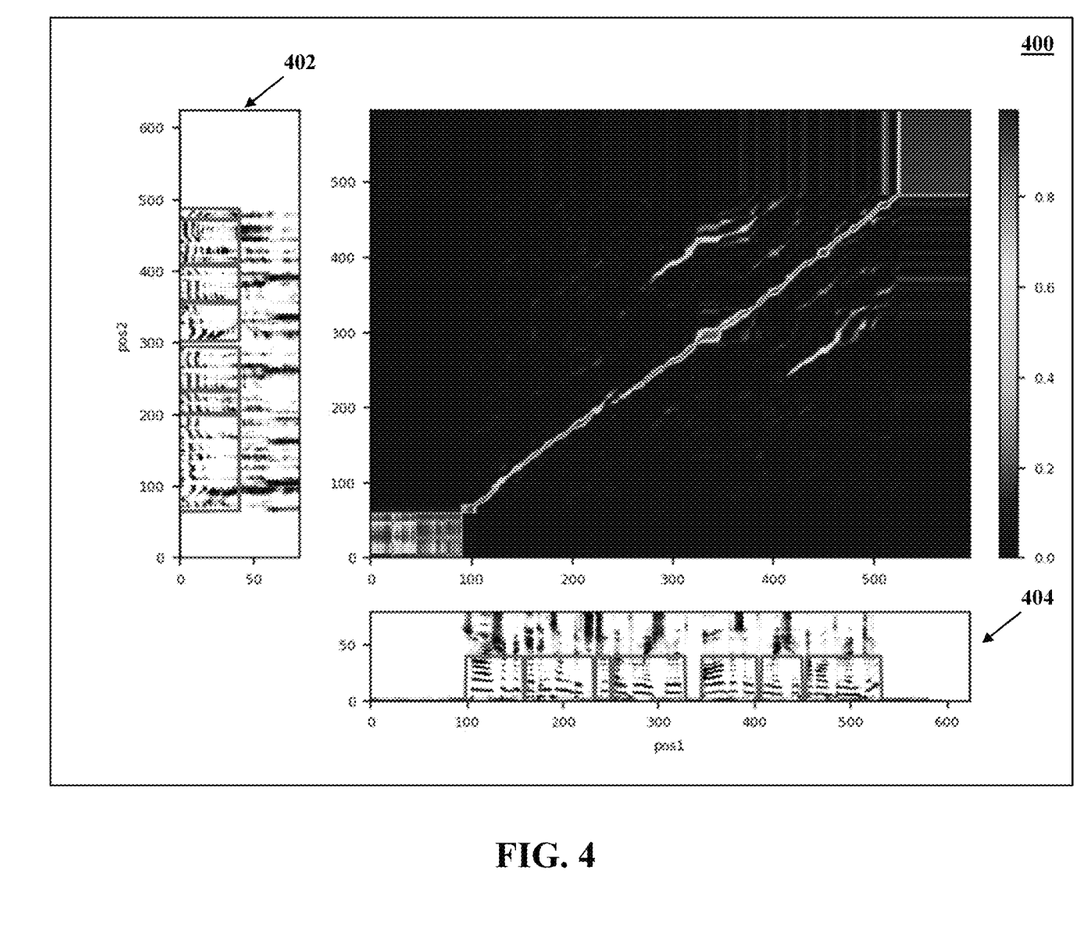
FIG. 4 is an exemplary representation of a "positive" parallel pair that may pass quality assurance depending on tolerance.
Figure 5:
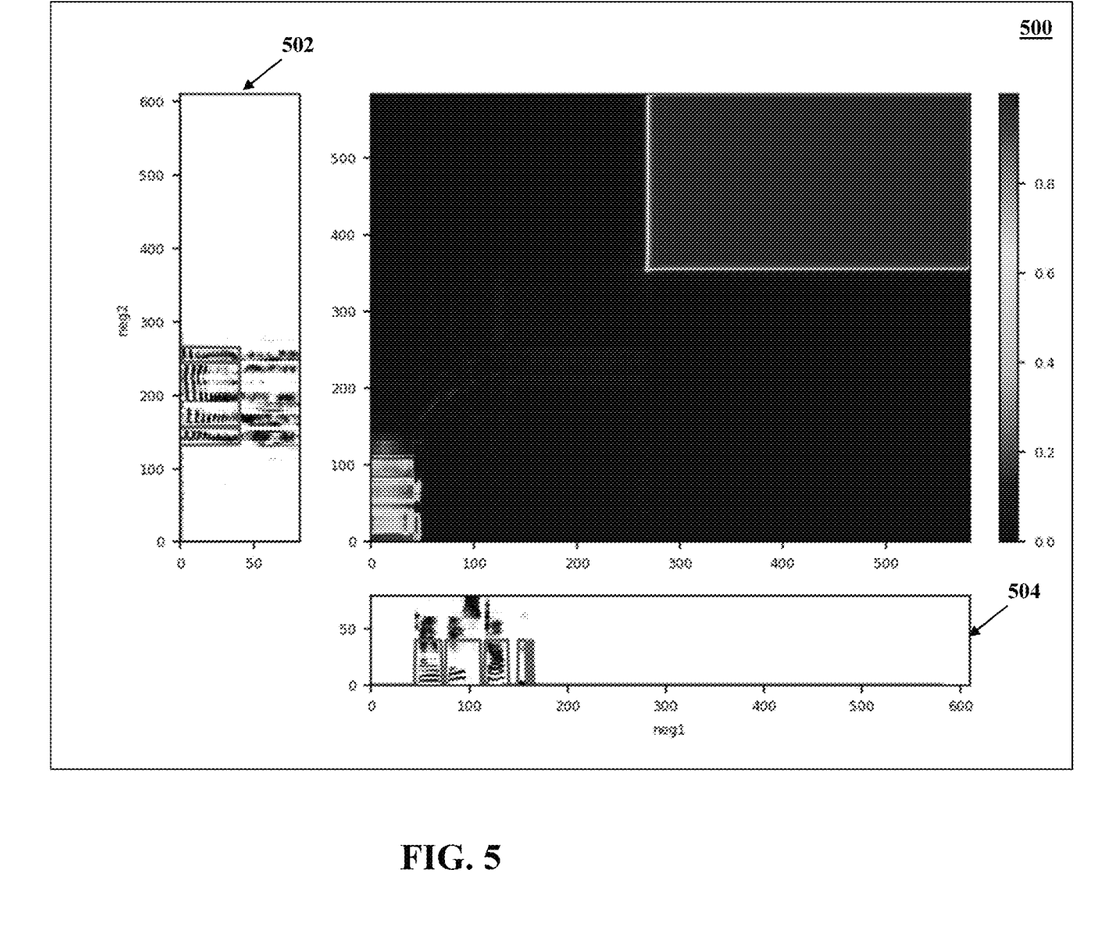
FIG. 5 is an exemplary representation of a "negative" parallel pair that may fail quality assurance depending on tolerance.

Referring to FIG. 4, an exemplary representation of a "positive" parallel pair that may pass quality assurance depending on tolerance or threshold is illustrated. Referring to FIG. 5, an exemplary representation of a "negative" parallel pair that may fail quality assurance depending on tolerance is illustrated. In these examples, the alignment difference of path-based distances between the first time series sequence representation 402 and the second time series sequence representation 404 of FIG. 4 is relatively small as compared to the alignment difference of path-based distances between the third time series sequence representation 502 and the fourth time series sequence representation 504 of FIG. 5. In other words, a straight diagonal is present in FIG. 4 that is not present in FIG. 5, which can be quantitatively scored to generate the quality metric (e.g., based on distance from a theoretical diagonal line or calculated coefficient correlations), as explained in more detail above.

Thus, selecting the candidate speech utterance from the "positive" parallel pair of FIG. 4 instead of the candidate speech utterance from the "negative" parallel pair of FIG. 5 can result in an improved voice conversion by the voice conversion system 100. Accordingly, as described and illustrated by way of the examples herein, the disclosed technology advantageously provides improved methods and systems for quantitatively selecting optimal candidate utterances to thereby improve the quality of the output of the voice conversion system 100.

Having thus described the basic concept of the technology, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations, therefore, is not intended to limit the claimed processes to any order except as may be specified in the claims. Accordingly, the technology is limited only by the following claims and equivalents thereto.

What is claimed is:

1. A voice conversion system, comprising memory having instructions stored thereon and one or more processors coupled to the memory and configured to execute the instructions to:
    convert a candidate utterance and a reference utterance in obtained audio data into first and second time series sequence representations, respectively, using acoustic features and linguistic features;
    perform a cross-correlation of the first and second time series sequence representations to generate a result representing a first degree of similarity between the first and second time series sequence representations;
    align the first and second time series sequence representations to generate an aligned version of the first and second time series sequence representations;
    after the alignment, adjust the aligned version of the first and second time series sequence representations based on a phoneme-based alignment;
    generate an alignment difference of path-based distances between the reference and candidate speech utterances based on the adjusted aligned version of the first and second time series sequences representations;
    generate a quality metric based on the result of the cross-correlation of the first and second time series sequence representations and the generated alignment difference of path-based distances between the reference and candidate speech utterances; and
    output the generated quality metric, wherein the generated quality metric is indicative of a second degree of similarity between the candidate and reference utterances.

2. The voice conversion system of claim 1, wherein the one or more processors are further configured to execute the instructions to generate the quality metric further based on a deviation of an alignment path between the reference and candidate utterances from an idealistic path.

3. The voice conversion system of claim 1, wherein the one or more processors are further configured to execute the instructions to derive the linguistic features using a natural language processing (NLP) technique, wherein the linguistic features comprise one or more phoneme embeddings.

4. The voice conversion system of claim 1, wherein the one or more processors are further configured to execute the instructions to apply a neural network to the first and second time series sequence representations to generate the result of the cross-correlation, wherein the neural network is trained based on one or more of other acoustic features, other linguistic features, language-specific phonemes, or language models.

5. The voice conversion system of claim 1, wherein the one or more processors are further configured to execute the instructions to apply a neural network to the first and second time series sequence representations to generate a distance metric comprising a Euclidean distance or cosine similarity, wherein the alignment difference is determined based on the distance metric.

6. The voice conversion system of claim 1, wherein the one or more processors are further configured to execute the instructions to, before the alignment difference is generated:
align the first and second time series sequence representations using dynamic time warping (DTW); and
adjust the aligned first and second time series sequence representations based on one or more phoneme distinctions between the first and second time series sequence representations.

7. The voice conversion system of claim 6, wherein the one or more processors are further configured to execute the instructions to:
segment the aligned first and second time series sequence representations into a first plurality of phonemes; and
compare a second plurality of phonemes between the segmented first and second time series sequence representations to identify the phoneme distinctions.

8. A method for determining quality assurance of parallel speech utterances, the method comprising:
converting a candidate utterance and a reference utterance in obtained audio data into first and second time series sequence representations, respectively;
performing a cross-correlation of the first and second time series sequence representations;
aligning the first and second time series sequence representations based on one or more differences in lengths of the first and second time series sequences representations to generate an aligned version of the first and second time series sequence representations;
after the alignment, adjusting the aligned version of the first and second time series sequence representations based on a phoneme-based alignment;
generating an alignment difference of path-based distances between the reference and candidate speech utterances based on the adjusted aligned version of the first and second time series sequences representations;
generating a quality metric based on the cross-correlation of the first and second time series sequence representations and the generated alignment difference of path-based distances between the reference and candidate speech utterances; and
outputting the generated quality metric, wherein the generated quality metric is indicative of a degree of similarity between the candidate and reference utterances.

9. The method of claim 8, wherein the candidate and reference utterances are converted using acoustic features and linguistic features, the linguistic features comprise one or more phoneme embeddings, and the method further comprises deriving the linguistic features using a natural language processing (NLP) technique.

10. The method of claim 8, further comprising generating the quality metric further based on a deviation of an alignment path between the reference and candidate utterances from an idealistic path.

11. The method of claim 8, further comprising applying a neural network to the first and second time series sequence representations to perform the cross-correlation, wherein the neural network is trained based on one or more of acoustic features, linguistic features, language-specific phonemes, or language models.

12. The method of claim 8, further comprising applying a neural network to the first and second time series sequence representations to generate a distance metric, wherein the alignment difference is determined based on the distance metric.

13. The method of claim 8, further comprising:
aligning the first and second time series sequence representations using dynamic time warping (DTW); and
adjusting the aligned first and second time series sequence representations based on one or more phoneme distinctions between the first and second time series sequence representations.

14. The method of claim 13, further comprising:
segmenting the aligned first and second time series sequence representations into a first plurality of phonemes; and
comparing a second plurality of phonemes between the segmented first and second time series sequence representations to identify phoneme distinctions.

15. One or more non-transitory computer-readable media comprising instructions that, when executed by at least one processor, cause the at least one processor to:
perform a cross-correlation of first and second time series sequence representations generated from a candidate utterance and a reference utterance, respectively, in obtained audio data;
align the first and second time series sequence representations to generate an aligned version of the first and second time series sequence representations;
after the alignment, adjust the aligned version of the first and second time series sequence representations based on a phoneme-based alignment;
generate an alignment difference of path-based distances between the reference and candidate speech utterances based at least in part on the adjusted aligned version of the first and second time series sequences representations;
generate a quality metric based on the cross-correlation of the first and second time series sequence representations and the generated alignment difference of path-based distances between the reference and candidate speech utterances; and
output the generated quality metric, wherein the generated quality metric is indicative of a degree of similarity between the candidate and reference utterances.

16. The one or more non-transitory computer-readable media of claim 15, wherein the candidate and reference utterances are converted using acoustic features and linguistic features, the linguistic features comprise phoneme embeddings, and the instructions, when executed by the at least one processor further causes the at least one processor to derive the linguistic features using a natural language processing (NLP) technique.

17. The one or more non-transitory computer-readable media of claim 15, wherein the instructions, when executed by the at least one processor further causes the at least one processor to generate the quality metric further based on a deviation of an alignment path between the reference and candidate utterances from an idealistic path.

18. The one or more non-transitory computer-readable media of claim 15, wherein the instructions, when executed by the at least one processor further causes the at least one processor to apply a neural network to the first and second time series sequence representations to perform the cross-correlation.

19. The one or more non-transitory computer-readable media of claim 15, wherein the instructions, when executed by the at least one processor further causes the at least one processor to:

align the first and second time series sequence representations using dynamic time warping (DTW); and adjust the aligned first and second time series sequence representations based on one or more phoneme distinctions between the first and second time series sequence representations.

20. The one or more non-transitory computer-readable media of claim 19, wherein the instructions, when executed by the at least one processor further causes the at least one processor to:

segment the aligned first and second time series sequence representations into phonemes; and compare a plurality of phonemes between the segmented first and second time series sequence representations to identify the phoneme distinctions.

* * * * *